(12) United States Patent
D'Arrigo et al.

(10) Patent No.: US 7,763,372 B2
(45) Date of Patent: Jul. 27, 2010

(54) FUEL CELL FORMED IN A SINGLE LAYER OF MONOCRYSTALLINE SILICON AND FABRICATION PROCESS

(75) Inventors: Giuseppe D'Arrigo, Tremestieri Etneo (IT); Salvatore Coffa, Tremestieri Etneo (IT)

(73) Assignee: STMicroelectronics S.R.L., Agrate Brianza (MI) (IT)

( * ) Notice: Subject to any disclaimer, the term of this patent is extended or adjusted under 35 U.S.C. 154(b) by 1111 days.

(21) Appl. No.: 11/383,088

(22) Filed: May 12, 2006

(65) Prior Publication Data

US 2006/0255464 A1    Nov. 16, 2006

(30) Foreign Application Priority Data

May 13, 2005   (IT)   .......................... VA2005A0034

(51) Int. Cl.
  *H01M 4/00*   (2006.01)
  *H01L 23/48*  (2006.01)
(52) U.S. Cl. ........................................ 429/40; 257/758
(58) Field of Classification Search ................. 257/758; 429/12–46
  See application file for complete search history.

(56) References Cited

U.S. PATENT DOCUMENTS

| | | | |
|---|---|---|---|
| 5,316,869 A | 5/1994 | Perry, Jr. et al. | 429/19 |
| 5,480,735 A * | 1/1996 | Landsman et al. | 429/13 |
| 6,506,513 B1 | 1/2003 | Yonetsu et al. | 429/34 |
| 6,541,149 B1 | 4/2003 | Maynard et al. | 429/40 |

(Continued)

FOREIGN PATENT DOCUMENTS

DE    197 57 320    1/1999

(Continued)

OTHER PUBLICATIONS

D'Arrigo et al., "Fabrication of Miniaturised Si-based Electrocatalytic Membranes", vol. C23 No. 1-2 dated Jan. 15, 2003, pp. 13-18, XP002386579.

(Continued)

*Primary Examiner*—Patrick Ryan
*Assistant Examiner*—Muhammad Siddiquee
(74) *Attorney, Agent, or Firm*—Lisa K. Jorgenson; Allen, Dyer, Doppelt, Milbraith & Gilchrist, P.A.

(57) ABSTRACT

Fuel cells are formed in a single layer of conductive monocrystalline silicon including a succession of electrically isolated conductive silicon bodies separated by narrow parallel trenches etched through the whole thickness of the silicon layer. Semicells in a back-to-back configuration are formed over etch surfaces of the separation trenches. Each semicell formed on the etch surface of one of the silicon bodies forming an elementary cell in cooperation with an opposite semicell formed on the etch surface of the next silicon body of the succession, is separated by an ion exchange membrane resin filling the separation trench between the opposite semicells forming a solid electrolyte of the elementary cell. Each semicell includes a porous conductive silicon region permeable to fluids, extending for a certain depth from the etch surface of the silicon body, at least partially coated by a non passivable metallic material. Each of the porous and fluid permeable regions communicates with a feed duct of a fuel fluid or of oxygen gas that extends parallel to the etch surface inside the conductive silicon body.

7 Claims, 5 Drawing Sheets

U.S. PATENT DOCUMENTS

| | | | |
|---|---|---|---|
| 6,558,770 B1 | 5/2003 | Lehmann et al. | 428/138 |
| 6,589,682 B1 | 7/2003 | Fleckner et al. | 429/34 |
| 6,610,433 B1 | 8/2003 | Herdeg et al. | 429/17 |
| 6,627,342 B1 | 9/2003 | Nakamura et al. | 429/26 |
| 6,641,948 B1 | 11/2003 | Ohlsen et al. | 429/44 |
| 6,740,444 B2 | 5/2004 | Leban | 429/41 |
| 6,811,916 B2 | 11/2004 | Mallari et al. | 429/36 |
| 2002/0020053 A1 | 2/2002 | Fonash et al. | 29/623.1 |
| 2002/0041991 A1 | 4/2002 | Chan et al. | 429/44 |
| 2003/0003347 A1 | 1/2003 | D'Arrigo et al. | 429/44 |
| 2003/0022052 A1 | 1/2003 | Kearl | 429/34 |
| 2003/0096146 A1 | 5/2003 | Foster | 429/30 |
| 2003/0134172 A1 | 7/2003 | Grande et al. | 429/34 |
| 2004/0058153 A1 | 3/2004 | Ren et al. | 428/408 |
| 2004/0142214 A1* | 7/2004 | Priore et al. | 429/12 |
| 2004/0217447 A1* | 11/2004 | D'arrigo et al. | 257/622 |

FOREIGN PATENT DOCUMENTS

| | | |
|---|---|---|
| DE | 199 14 681 | 5/2000 |
| EP | 1 258 937 | 11/2002 |
| WO | 00 45457 | 8/2000 |
| WO | 00 69007 | 11/2000 |

OTHER PUBLICATIONS

Hayase et al., "Miniature 250 [mu]m Thick Fuel Cell with Monolithically Fabricated Silicon Electrodes", vol. 7, No. 8 dated Aug. 2004, pp. A231-A234, XP002386580, ISSN: 1099-0062.

* cited by examiner

FUEL CELL FORMED IN A SINGLE LAYER OF MONOCRYSTALLINE SILICON AND FABRICATION PROCESS

FIELD OF THE INVENTION

The present invention relates in general to silicon devices, and more particularly to micro fuel cells formed on silicon for powering electronic circuits.

BACKGROUND OF THE INVENTION

Efforts to make portable useful devices and electronic systems that are already sufficiently miniaturized by virtue of modern fabrication techniques often clash with the difficulty of finding portable power sources capable of ensuring a prolonged service, that is of power packs of suitably high energy/volume ratio. In fact, notwithstanding miniaturization and a constant reduction of current absorption of modern integrated electronic systems that reach ever higher levels of compactness and reduction of size of integrated structures the accompanying increase of the number of functions of these portable devices poses heavy requirements on rechargeable batteries as commonly used in these portable devices.

In view of the limits of the obtainable energy/volume ratio even for the most advanced commercially available rechargeable batteries, there is a growing interest on primary energy converters among which in particular on fuel cells capable of transforming chemical oxidation energy of a fuel (typically hydrogen or methanol or other oxidable compound in gaseous form of in solution), into electrical energy. Fuel cells include catalytic electrodes permeable by the fluid reagent, separated by an electrolyte, generally a solid polymer electrolyte constituted by a film of ion exchange resin, typically for protons ($H^+$), which besides constituting the medium (electrolyte) through which an ionic current may flow, also ensure a physical separation of the fuel that is fed to the negative porous catalytic electrode (anode) from the oxygen (air or oxygen in a mixture or pure oxygen) fed to the positive porous catalytic positive counterelectrode (cathode) of the cell.

Fuel cells offer an energy/volume ratio much greater than most advanced rechargeable batteries and its operating life is theoretically unlimited as long as there is availability of fuel and suitable fuels may be stored in large quantity in relatively small and lightweight reservoirs, even at superatmospheric pressure.

The general structure of fuel cell for large power applications such as for electrical vehicles or designed for a context of capillary use of ducted hydrogen as energy vector (hydrogen economy) is well known and sufficiently described in literature. More specifically, important studies are being conducted for realizing fuel cells in micrometric scale directly on monocrystalline silicon, by exploiting modern techniques of silicon micromachining (MEMS) through chemical/electrochemical preferential etchings of specifically doped regions of the crystal followed by oxidation of residual porous silicon and leaching of the oxidized residual silicon, that have been developed for realizing sensors, actuators, transducers and passive electrical components integratable on the same chip on which is integrated the circuit or electronic subsystem using the sensor, actuator or the component formed by micromachining the silicon crystal.

U.S. Pat. Nos. 6,541,149-6,811,916-6,558,770-6,641,948-5,316,869-6,627,342-6,740,444-6,506,513-6,589,682-6,610,433, the published US Patent Applications Nos. 2003/0022052A1, 2003/0096146A1, 2002/0020053A1, 2003/0134172A1, 2002/0041991A1, 2003/0003347A1, 2004/0058153A1, the documents WO0069007, DE19914681A, WO 0045457, DE19757320A, JP07201348 and EP-A-1258937, provide a survey of known architectures of micro-fuel cells formed on silicon. As may be observed, the approach has so far been based on the realization on a silicon substrate of a semicell structure provided with relative inlet, distributing ducts of the relative fuid reagent to the porous catalytic electrode structure of the semicell and eventual outlet or vent.

The two semicells made on distinct dies of the silicon crystal, in a substantially specular manner, are thereafter joined by interposing between them, over the whole active area of the cell, an ion exchange resin separator, over the opposite surface of which may have already been incorporated an intimately adherent layer of particles of a catalytic electrodic material, thus bringing therefore the active surfaces of the two porous electrodic structures in contact with the ion exchange resin of the separating membrane sandwiched between the two silicon semicell structures.

The constitution of the fuel cell with two distinct dices of silicon through wafer bonding techniques greatly complicates the electrical interconnectivity of the electrodes of a cell with electrodes of other cells that may be formed on the same device to achieve, through series-parallel interconnections of cells, an electric current source at a certain voltage (i.e. an integral multiple of the elementary cell voltage), as well as between the so-constituted electrical source and the integrated circuitry to be powered, which may be realized on a separate chip or even on the same chip on which one or more semicell structures are formed.

Another aspect of known architectures of silicon fuel cells is the need of forming metal grid current distributors over and in contact with the respective porous catalytic electrode layers intimately formed in contact with the ion exchange resin of which the relative half-cell electrode reaction of oxidation (at the anode of the cell and of reduction of the cathode at the cell) takes place. In fact, the porous high specific surface area of the catalytic electrode particles in contact with the solid electrolyte constituted by the ion exchange resin of the separating membrane, and the relative thinness of these electrode layers, determine a non-negligible electrical resistance to electronic current flow on the plane of the layer, that often is incompatible with the need of realizing an active electrode area sufficiently large to produce the desired current, considering the limit to the current density on the active cell area that may be achieved at an acceptable voltage.

In realizing multi cell bipolar stack of fuel cells to generate a battery voltage multiple of the elementary cell voltage, the classic approach is to realize bipolar electrode septa (plates), having inlet and eventually outlet ports for feeding respective reagent fluids to the porous electrode structures (eventually comprising even a superficial layer of catalytic material) formed on the two opposite surfaces of the bipolar conductive silicon plate to be eventually stacked interposing between adjacent bipolar (electrodes) plates membranes of ion exchange resin that may already be provided with a bonded layer of particles of catalytic materials over the active cell area on the opposite surfaces of the ion exchange membrane that are contacted by respective porous electrode structures of the conducting bipolar plates (re: US 2004/0185323A1 and U.S. Pat. No. 6,589,682).

Negative aspects deriving on the way the permeable porous electrode structures of the cells can be formed, are their scarce mechanical sturdiness that is poorly suited for a sandwich like clamping of the ion exchange resin membrane between opposing surfaces of two silicon plates. Although during deposition of the catalytic metal on porous silicon electrode structures the deposited metal joins to the definition edges of previously formed metal lines of a current collecting grid, already exploited as a hard mask for forming the porous silicon electrode compartment, the composite structure remains mechanically weak.

On account of the current density limits per unit of active area of fuel cells determined by technological limitations of ensuring a sufficient mass transfer of reagents to the active sites of electrochemical half-cell reactions, the area of monocrystalline silicon that is required for generating a certain maximum nominal current that can be absorbed by an electrical load at a certain voltage, represents an important factor for the most cost-efficient exploitation of silicon area for forming the fuel cells. Its significant improvement would permit to significantly lower the cost of these devices.

SUMMARY OF THE INVENTION

In view of the state of the art in realizing micro fuel cells on monocrystalline silicon, the applicants have found a new architectural approach that overcomes the above-noted limitations, criticalnesses and inefficiencies and offers other important advantages among which include a simpler more reliable construction.

Fuel cells of the architecture of this invention are realized with normal fabrication techniques according to a fabrication process that is also an object of this invention.

According to this invention, fuel cells are formed in a single layer or die of conductive monocrystalline silicon without requiring the formation of semicells on two distinct dies of silicon to be successively joined, interposing between the active areas of the semicells a separating film or membrane of ion exchange resin constituting a solid electrolyte of the cells.

Basically, the invention permits the realization of a plurality of elementary fuel cells, either in a monopolar or in a bipolar configuration, on a single die or layer of electrically conductive doped monocrystalline silicon, that is in a completely monolithic fashion.

An array of elementary fuel cells of this invention, includes a succession of electrically conductive silicon bodies, each constituting two semi cells in a back-to-back configuration, that are defined and electrically isolated from one another by narrow parallel trenches etched through the whole thickness of an electrically conductive doped monocrystalline silicon layer in which the fuel cells are formed. Parallel trenches of separation between adjacent bodies are eventually filled with an ion exchange resin to form the solid electrolyte of each elementary cell of the multicell array, composed by the semicell formed along one side of the bodies and by the semicell facing it of the adjacent silicon body of the succession.

Internally to each of the conductive silicon bodies are formed two parallel holes or ducts running parallel to the respective etch surfaces of the parallel separation trenches, for introducing and distributing the reagents to the active electrodes of the cells. Before filling the separation trenches with the ion exchange resin, porous electrode structures of a conductive material provided with a superficial layer of an electrocatalytic material, the whole electrode structure remaining permeable to gas or to a solution of reagent compound, are formed over the opposite etch surfaces of each separation trench between adjacent conductive silicon bodies. This is done by selectively etching, chemically and/or electrochemically, domains of highest concentration of dopants in the silicon crystal and the selective erosion is continued as far as reaching the longitudinal internal cavity of the respective duct for the introduction and distribution of the reagent fluid.

The semicell structures are formed on the opposing side (vertical) surfaces of each separation trench of adjacent doped conductive silicon body by conducting the selective erosion process through the same openings of the hard mask metal layer present on the surface of the wafer that was used for the anisotropic etching of the parallel separation trenches for defining the adjacent silicon bodies. The hard mask is of a metal that resists the chemical/electrochemical etching to be conducted over the vertical surfaces of the trenches, preferably the hard mask is of gold.

Each semicell structure formed on a vertical etch surface of a separation trench between adjacent conductive silicon bodies includes therefore a porous (spongy) region of selectively eroded silicon that is electrically conductive and permeable to fluids being that is in communication with an underlying distribution duct of either a fuel fluid or of an oxygen containing gas of the pair of parallel ducts previously formed within the conductive silicon body parallely alongwith the respective side walls of the separation trenches of the silicon body from similar adjacent bodies of the succession or array of parallel bodies.

Of course, the conductive silicon bodies are electrically isolated among each other. The electrical isolation on the basement plane from which the conductive parallel bodies extend may have been preestablished by defining the conductive silicon bodies through a conductive silicon layer of adequate thickness associated to a dielectric substrate, for example in a so-called SOI composite, that is through a doped monocrystalline silicon layer either formed on a substrate layer of silicon that is subsequently converted into a dielectric oxide or bonded onto the surface of an appropriate dielectric support.

Alternatively, the electrical isolation on the bottom plane of the conducting bodies of silicon defined through the whole thickness of a doped epitaxial layer of silicon grown on a silicon substrate can be provided by an n/p junction purposely established by the conductive doped epitaxial layer of silicon through the thickness of which the electrically conducting bodies are defined and an oppositely doped silicon substrate. The electrical isolation at the two extremities of the parallel conducting bodies of silicon that is along the flanks of the succession of parallel bodies, may be established either by forming isolation trenches therealong or, more simply, by prolonging the parallel definition trenches of the succession of parallel electrically conducting bodies of silicon as far as reaching the respective sides of the eventually cut silicon dice.

In the latter Case, the separate introduction of respective reagents to homologous catalytic porous electrodes of the semicells separated by the ion exchange resin filling of the parallel trenches, may be conveniently arranged through inlet and outlet ducts or chambers purposely created in the packaging resin body, adjacent to the ends of the parallel conducting bodies of silicon, at the opposite sides of the silicon die.

In contrast to the known architectures, this invention offers the possibility of realizing in a silicon layer, with negligible modifications of the common fabrication process of these devices, an array or a battery of fuel cells either in a monopolar or in a bipolar configuration.

To realize an array of monopolar cells, the two semicells formed on the etch surfaces of the parallel trenches that define the conductive silicon bodies, will have the same sign or polarity (both semicells will either be anodic semicells or cathodic semicells) thus constituting two elementary cells in association with the cathodic semicell and the anodic semicell, respectively, of a conductive silicon body that precedes and of a conductive silicon body that follows the body in the array. In such a monopolar configuration, through both the parallel holes or ducts of fluid distribution that are formed internally of each conductive silicon body will be fed the same reagent fluid (fuel in case of anodic semicells or oxygen containing gas in case of cathodic semicells) while in the parallel holes or ducts of the two adjacent silicon bodies will be fed the other reagent fluid.

In practice, an alternate succession of cathodically polarized silicon bodies (−) and of anodically polarized silicon bodies (+) will be realized, respectively fed with an oxygen containing gas mixture, and with either a gas or a solution of a fuel for example hydrogen gas or a water solution of methanol.

In a bipolar configuration, the succession or array of parallel conductive silicon bodies forms a battery of fuel cells electrically in series. In this case, the two semicells formed on the opposite etch surfaces of a conductive silicon body will be an anodic semicell (+) and a cathodic semicell (−), respectively, and through the internal duct communicating with the successively produced porous electrode structure of the anodic semicell a fuel in gas form or in solution will be fed, while through the parallel duct communicating with the successively produced porous electrode structure of the other cathodic semicell will be fed a gas mixture containing oxygen.

This distinction between the fluids introduced in the two parallel ducts formed in each conductive silicon body can be prearranged when forming the two parallel ducts by ensuring that one of the two extend as far as the side end of the bipolar silicon body and end short of reaching the other side end of the body and, vice versa for the other of the two parallel ducts.

The metal layer of hard mask present on the relatively flat top surface of the silicon of the bipolar conductive bodies electrically isolated from one another, defined by the parallel trenches cut through the thickness of the conductive silicon layer, besides masking the silicon for defining the etch openings for cutting the parallel definition trenches that separate the distinct conductive silicon bodies, successively permits a uniform electrical biasing of the conductive silicon and masking of the top flat surface of the silicon during the electroerosion step for forming the conductive porous electrode structure permeable to fluids and during the subsequent activation of the porous electrode structures by deposition of catalytic non passivable metal on the opposite porous electrode structure of the semicells. Moreover, the metal layer on the top surfaces of the conductive silicon bodies constitutes, in the completed device, distinct pads connectable in a series-parallel scheme, in case of a monopolar cell array, or distinct taps at a different voltage in case of a bipolar cell battery.

As will be evident in case of a bipolar cell battery configuration, the metal layer present on the top surface of the distinct bipolar conductive silicon bodies of the battery of elementary fuel cells in series, constitutes connectable voltage taps, each at a voltage lower and higher of an elementary cells voltage in respect to the two adjacent taps in the succession.

In practice, considering a bipolar cell battery composed of an electrical series of ten elementary fuel cells and supposing a cell voltage of 1 Volt, current sources at a voltage scalable by 1 Volt steps, starting from a maximum full battery voltage of 10 Volts will be available, down to a minimum voltage of 1 Volt, present between the top metal layers (taps) of two adjacent bodies (the voltage of a single elementary cell). Of course, the voltage will be referred to a common ground node of the circuit. It will therefore be possible to connect to the common ground node any intermediate bipolar body for using the battery as source of current at a positive and/or at a negative voltage.

Waveform reconstruction techniques employing a plurality of discrete voltage sources may even permit to generate voltages of any waveform and of a certain frequency, e.g. alternate voltages, without using an inverter, as taught in WO 03/043170 and WO 2004/079849.

In consideration of the fact that the filling of the separation trenches with ion exchange resin for providing the ionic separator between the porous catalytic electrode structures of the two semicells intimately in contact with the ion exchange resin, may take place either by solidifying in situ an ion exchange resin solution, as for example a solution or colloidal suspension of Nafion® of Du Pont De Nemours E.I. & Co., or a suitable resin such as a vinylidene polyfluoride, ensures the establishment of an intimate contact between the superficial catalytic layer of the porous electrode structure of the two opposing semicells. Moreover, the criticalness of assembling (in a sandwich) two distinct porous structures with an interposed film of ion exchange resin, as in prior art techniques, that represents a critical operation because of the possibility of inducing excessive mechanical stresses on intrinsically delicate porous structures, overhanging the channels of distributing the fluid reagents to the porous catalytic electrodes, is practically eliminated.

DETAILED DESCRIPTION OF THE PREFERRED EMBODIMENTS

For fabricating the elementary fuel cell array of this invention, a conductive monocrystalline silicon layer 1 of thickness that may generally be comprised between 25 and 60 or more μm, with a Cz <100> crystal orientation, heavily doped, for example with boron, with a concentration generally comprised between $10^{18}$ and $10^{19}$ atoms/cm$^3$, isolated from the silicon substrate 2, by a dielectric layer 3 of oxidized silicon, may be used. On the surface of the silicon layer 1 a hard mask layer of silicon nitride 4 is formed, for example by chemical vapor deposition (CVD).

By photolithographic definition technique and subsequent anisotropic plasma etch of the nitride, pairs of parallel openings 5 and 6, having a width that may generally be of about 1 μm, preferably oriented along the crystallographic direction <110> of the monocrystalline silicon layer 1, are defined. The orientation of the parallel apertures along the crystallographic direction <110> of the silicon layer 1 is not obliged but is preferable for the objective of forming buried ducts in the silicon through chemical etching using different etching solutions for favoring certain directions of progression of the chemical etch. The nitride hard mask so defined is used for conducting anisotropic plasma etch of the silicon crystal 1, to cut pairs of parallel trenches 7 and 8, with a depth of about 21-22 μm, practically reaching down to about half the thickness of the monocrystalline silicon layer 1.

Figure 1:
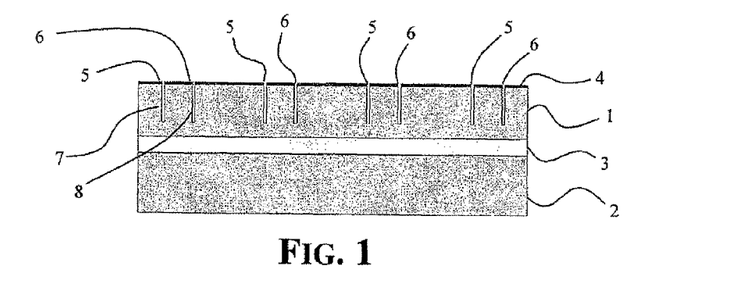
FIGS. 1 to 8 are schematic cross-sectional views showing various steps of the fabrication process of an array of fuel cells, according to an embodiment of the present invention.
Figure 2:
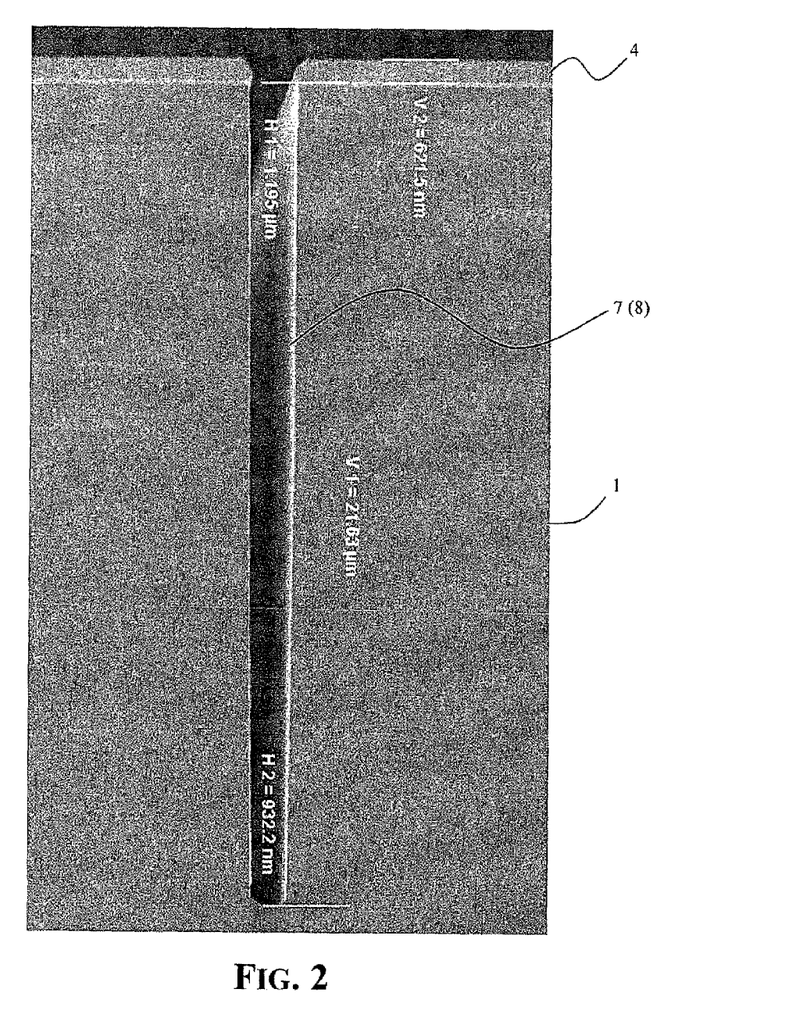

The results of these first steps of the process are schematically depicted in the cross section of FIG. 1 and in the detail microphotographic enlargement of FIG. 2. The pairs of narrow deep trenches 7 and 8 are precursor features of a pair of parallel channels 9 and 10, that are formed in the monocrystalline silicon layer 1 by chemical wet etch using a TMAH or KOH solution or other equivalent known technique, for example the so-called SCREAM process.

In case of wet chemical etch of the silicon crystal, it is well known that solutions at different concentrations of KOH or of TMAH etch the monocrystalline silicon at a rate that is strongly dependant on the crystallographic orientations and on the concentrations of dopants within the crystal. A suitable technique is described in detail and illustrated in the prior European Patent Application EP-A1427011-A1, of the same applicant.

Using KOH and TMAH etch solutions at different concentrations, the etching of the silicon, starting from the plasma etch surfaces of the precursor trenches 7 and 8, is promoted to form enlarged parallel channels 9 and 10 that tend to assume a romboedric cross section with diagonals of about 4 μm to about 8 or more μm, oriented in a way such that the etching undercut near the surface of the silicon layer 1, decreases progressively, thus avoiding that the superficial opening be significantly widened.

To enhance this phenomenon, it is even possible, as described in the already mentioned prior Patent Application EP-A-1427011-A1, to pre-grow an epitaxial layer (1') of few μm, with a higher dopant concentration (for example boron) $<10^{19}$ atoms/cm$^3$) on the monocrystalline substrate 1 before forming the hardmask 4, thus further limiting the progression of the isotropic chemical etch (undercut) near the surface, Alternatively, it is even possible to form narrow pairs of parallel openings in a photoresist mask through which anisotropically etch both a superfially grown epitaxial layer and the silicon substrate 1, to form narrow parallel trenches and successively forming a masking layer of silicon nitride over the top surface and over the etch surfaces of the pair of narrow trenches cut into the silicon, followed by anisotropically etching off of the hard mask of nitride over the bottom of the trenches, thus determining the level or initial cavity such that the subsequent progression of the isotropic chemical etch generates parallel channels of romboidal cross section that do not substantially reach the top surface of the silicon.

At this point of the process, after having removed any residue of the silicon nitride hard mask, a heavily doped layer of silicon 1' is epitaxially grown on the surface of the silicon crystal for a thickness that may generally be comprised between 4 and 10 or more μm, in any case of a thickness sufficient to seal the openings of the parallel channels 9 and 10, which, in cross section, become thereafter parallel ducts completely buried in the conductive body of monocrystalline silicon.

Figure 3:
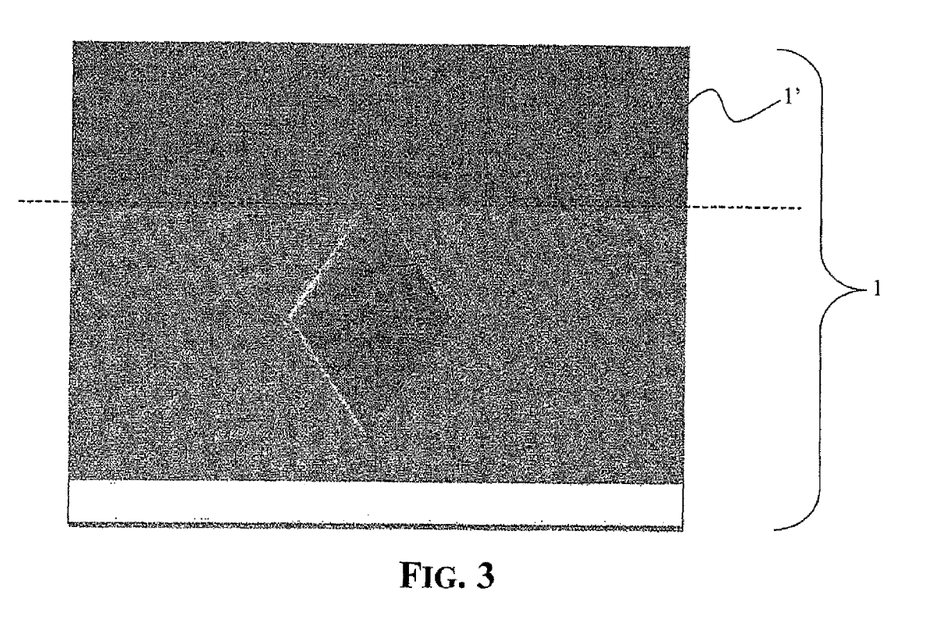
Figure 4:
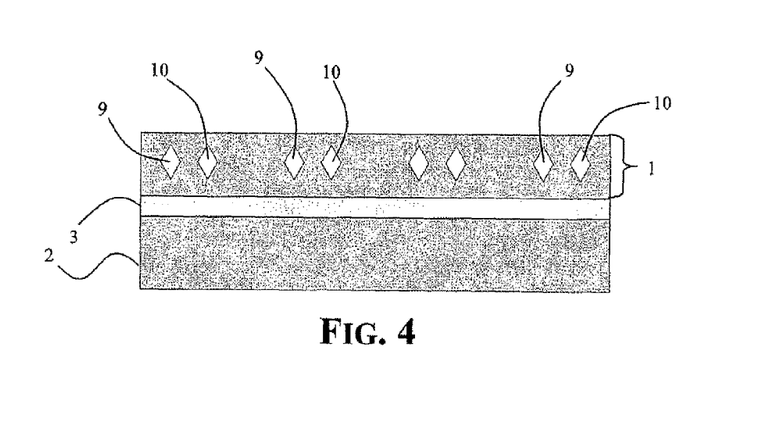
Figure 5:
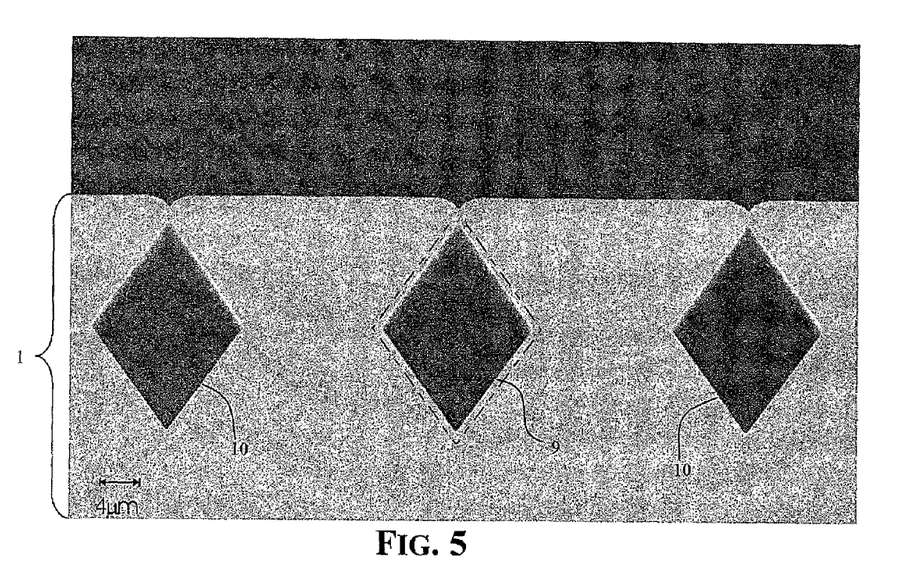
Figure 6:
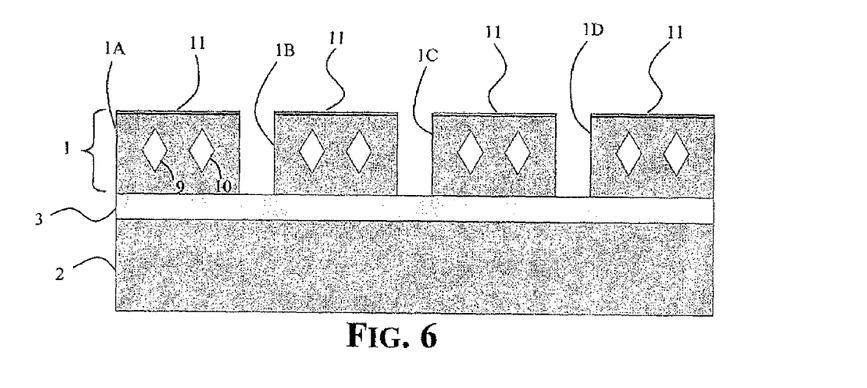

The structure assumes therefore the shape shown in the detailed microphotography of FIG. 3 and more in general in the schematic cross section of FIG. 4. The planar surface of the silicon is than freed of any residual native oxide by treating with a hydrofluoric acid solution and a thin (germ) gold layer is deposited by sputter etch on the silicon surface. This germ film of gold is thereafter grown by galvanic deposition of gold from an acid solution of a reducible gold salt until obtaining a layer of gold 11, that may have a submicrometric thickness or even be of few μm.

Thereafter, the gold layer 11 is lithographically patterned and the anisotropic plasma etching is protracted through the mask apertures, continuing to etch the underlying silicon as far down as reaching the isolation base layer 3 thus forming separation trenches between a plurality of conductive silicon bodies. The separation trenches between the so defined conductive silicon bodies 1A, 1B, 1C, 1D, etc., are formed between the plurality of distinct pairs of parallel buried ducts 9 and 10 previously formed in the conductive silicon and the trenches may have a width generally comprised between 2 and 6 μm. At the end of the fabrication process, these separation trenches will be filled with the ion exchange resin (PEM) that will constitute the separating polymeric solid electrolyte of the catalytic electrode structures intimately contacting the ion exchange resin formed on porous electrode structures created on the vertical etch surfaces of the separation trenches (semicells).

The gold layer 11, present on the top planar surface of the defined bodies of conductive silicon 1A, 1B, 1C, ... 1D, etc., provides and electrical connectable pad of the conductive silicon body for carrying out the successive step of electrochemical erosion of the doped silicon on the vertical walls of the separation trench between the electrically isolated adjacent conductive bodies of silicon to form regions 12 and 13 of porous conductive silicon, permeable to fluid.

The electrochemical erosion of the heavily doped silicon of the vertical definition surfaces of the bodies progresses by preferentially dissolving the silicon in domains of the monocrystal at relatively lower local concentration of dopant compared to adjacent domains of higher concentration of dopant, thus intercommunicating pores form in the crystal that eventually assumes the form of an open cell spongy mass permeable to fluid. This dopant concentration selective electrochemical erosion process is protracted as far as extending in depth the regions 12 and 13 rendered highly porous of the silicon, as far as reaching the respective buried ducts 9 and 10 that were previously formed in the silicon layer 1.

Figure 7:
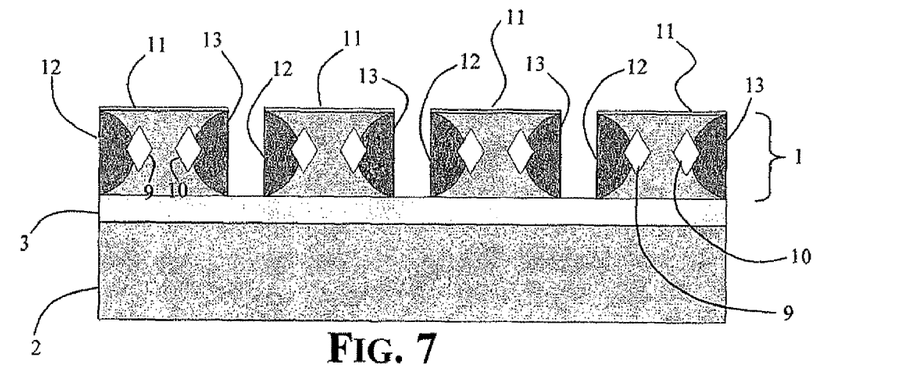

FIG. 7 shows in a schematic cross section the results of the phase of electrochemical erosion of the silicon to form porous regions 12 and 13, the profile of which within the silicon crystal merges with that of the respective buried ducts 9 and 10, through which the specific reagent fluid will be introduced and which will thus readily permeate the open pores of the porous regions communicating with the feed ducts along the whole length or at least for a major portion of it, of the conductive silicon bodies.

The porous silicon regions 12 and 13 so formed in communication with the underlying distributing channels 9 and 10 of the reagent fluid, are activated by depositing on the porous silicon, at least in a superficial portion of the porous regions 12 and 13, a nonpassivable catalytic metal, typically a noble metal, such as platinum, iridium, ruthenium, rhodium, palladium, alloys or conductive sub-oxides thereof. This is done, for example, by applying to the surface of the porous regions an acid solution of thermodecomposable salts of the metals, evaporating the solvent and reducing the metal in oven under a reducing atmosphere or even in an atmosphere containing also a certain amount of oxygen to promote the formation of a non stoichiometric, electrically conductive suboxide of the noble metal.

The activation treatment increases the electrical conductivity of the porous silicon structure, ensures non passivability of the electrodically active surface of the structure because of the formation of dielectric oxide films and provides electronic conductive solid surfaces having the property of catalizing the desired electrode reaction at sites of contact between the electronically conductive solid, the ion exchange resin constituting the solid polymeric electrolyte (PEM) of the cell, reached by the specific fluid reagent, for supporting the half-cell reaction of the elementary fuel cell.

On the surface of the activated porous electrodic structures 12 and 13, to be contacted by the ion exchange resin (PEM) filling of the separation trenches between opposite half cell structures formed on the definition vertical surfaces of the conductive silicon bodies 1, may even be deposited preformed particles of highly catalytic material, for example by suspending them in the solution of thermodecomposable salt of nonpassivable noble metal, that is by applying a slurry on the surface of the porous silicon region, or by depositing the nonpassivable noble metal on the surface of the porous silicon region, using for example a suspension of catalytic noble metal particles in a solution of a polymeric ligand of relatively high superficial tension and with hydrophobic properties to be solidified in situ by evaporating the solvent. Highly catalytic materials that may be used are for example platinum black, iridium black, ruthenium black, rhodium black and palladium black, that is a non passivable noble metal in the form of micrometric and submicrometric particles of large specific surface area.

Figure 8:
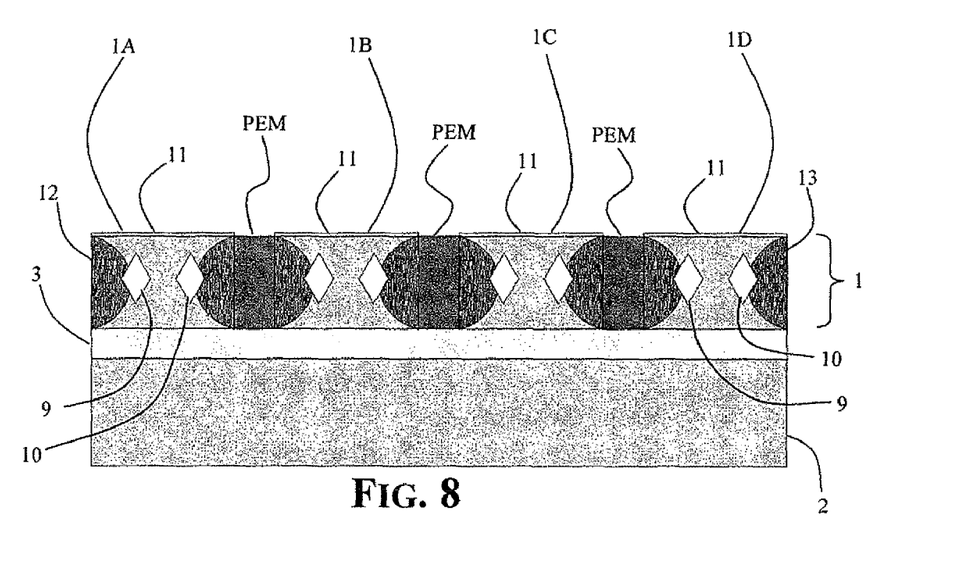

The final step in constituting the array of elementary fuel cells in a single silicon layer according to the present invention, as schematically depicted in FIG. 8, includes completely filling the separation trenches among the distinct bodies of conductive silicon and therefore of the half cell active structures formed on the vertical etch surfaces of the silicon bodies, with an ion exchange resin, as for example a resin based on a sulphonated perfluoro hydrocarbon monomer, as for example the commercial product Nafion® of Du Pont E.I. de Nemours & Co., or other equivalent ion exchange resin.

The filling may be conducted by solidifying in situ a solution of the ion exchange resin, as for example a solution or colloidal suspension of Nafion® or of other ion exchange resin, such as a polyfluoride of vinylidene, by adjusting the rheologic characteristics of the suspension (fluidity) in order not to flood completely the porous electrodic structures 12 and 13, but on the contrary to only wet a shallow superficial layer of the porous structure thus establishing an intimate contact with the catalytic surface layer of the porous electrodic structures of the two opposite semicelis. The filling of the separation trenches may be carried out by a spinning technique as the one normally used for applying a resist layer over the surface of the silicon wafer. The resin in excess that solidifies onto the surface of the gold layer 11, may be removed by a masked or unmasked plasma etch in oxygen atmosphere or by any other equivalent technique.

Natural fibers and/or particles of hydrophilic materials To the solution or suspension of ion exchange resin may be added to absorb and retain moisture within the resin for helping in contrasting excessive dehydration in case of prolonged periods of inactivity of the fuel cell device. The filling of the separation trenches with ion exchange resin for constituting a solid polymeric electrolyte of the elementary cell, must in any case take place in a way that will promote the establishment of an intimate contact of the ion exchange resin with the active (catalytic) surface of the composite porous electrode structure of the semicell.

Figure 9:
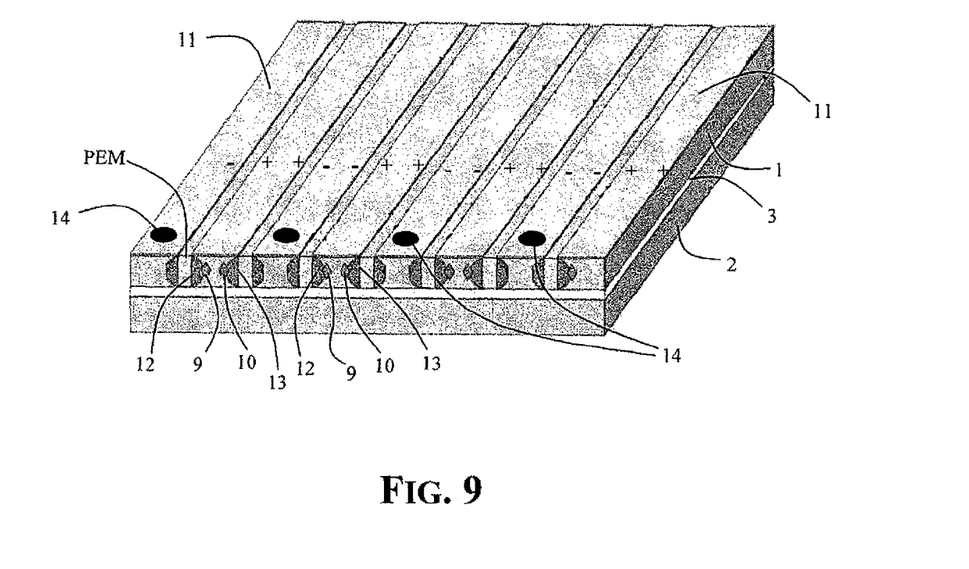
FIG. 9 is a partial three-dimensional cross-sectional view of an array of elementary cells in a monopolar configuration, according to a first embodiment of the device of the present invention.

The schematic three-dimensional view of FIG. 9 shows a monopolar array of seven elementary cells. By looking at the inlet side of the fuel, for example hydrogen gas or a methanol solution, the pairs of parallel ducts 9 and 10 that bring the fuel to the respective porous anodic structures 12 and 13 in contact with the ion exchange resin membrane (PEM) formed in the conductive silicon bodies, extend from the side of observation and end short of reaching the opposite side (in practice they are originally defined in the silicon as "blind holes" closed at one end). Alternately, in the different conductive silicon bodies of the array, such pairs of ducts 9 and 10 open on the opposite flank that is on the inlet side of oxygen or oxygen containing gas mixture and end short of reaching the side of the silicon bodies on the flank of observation of the three-dimensional figure.

Preferably, the blind end of the ducts 9 and 10 that feed the oxygen or oxygen containing gas mixture to the respective cathodic porous semicell structures, is intercepted by a ventilation hole 14 to permit a forced circulation of oxygen containing gas along the channels and of promoting the venting of moisture produced by the cathodic reaction. Vice versa, a gaseous fuel may be fed through the distributing ducts to the porous catalytic anodic structures of the cells by simply ensuring the maintenance of a certain over pressure in the feed conduits of the fuel. To contrast dehydration phenomena of the ion exchange membrane that may reduce the ability of protons ($H^+$) to migrate through the ion exchange resin, a gaseous fuel may be saturated with water vapor.

According to this monopolar embodiment, the two semicell structures, that is the two porous catalytic regions 12 and 13 that constitute the electrodes in contact with the ion exchange resin (PEM) of each conductive silicon body have the same polarity that alternate from one body to the next in the succession. In practice, the electrodes on the opposite faces of each conductive silicon body are both, alternately, cathodes or anodes, as indicated by the relative symbols (−) and (+). In such a monopolar configuration, the single elementary cells can be electrically connected according to a certain series-parallel scheme by establishing the necessary contacts on the gold layer 11 present on the top surface of the conductive silicon bodies.

Figure 10:
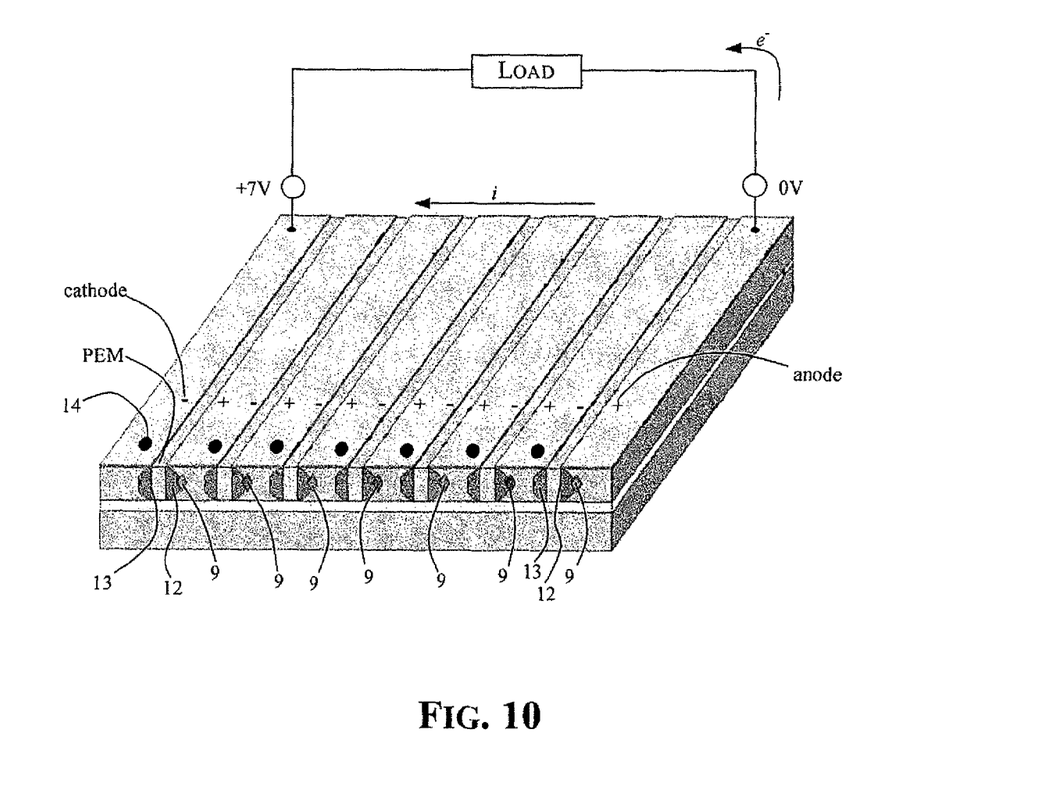
FIG. 10 is a partial three-dimensional cross-sectional view of an array of elementary cells in a bipolar configuration, according to an alternative embodiment.

FIG. 10 illustrates, in the form of a similar three-dimensional view, a configuration of the plurality of cells as a bipolar battery of seven elementary cells in electrical series, according to an alternative embodiment of this invention. As may be observed, contrary to the monopolar configuration of FIG. 9, on the flank from where fuel is fed, only one (9) of the two parallel ducts of each conductive silicon body opens while the other duct 10 of the pair opens on the opposite flank (not visible in the three-dimensional view) that is on the flank from where oxygen or oxygen containing gas mixture is introduced. As a consequence, in this case, the ventilation holes 14 intercept the ends of only the other duct 10 of the two parallel channels formed in each conductive silicon body, that opens on the opposite flank of inlet of oxygen or oxygen containing gas mixture.

According to such a bipolar configuration of the seven elementary cells, each conductive body of silicon constitutes a bipolar conductive septum, with porous electrode structures 12 and 13 formed over opposite definition surfaces of each body and are in this case an anode 12 on one face and a cathode 13 on the opposite face of a same conductive silicon body. This is symbolically indicated by the respective symbols (−) and (+) traced over the conductive silicon bodies.

In this case, as symbolically indicated by the two end terminals 0V and +7V of the battery of seven elementary cells, the electrical current i flows in the direction indicated by the arrow, crossing in series the seven elementary cells. Obviously, connection of distinct electrical loads (Load) to intermediate voltage taps of the battery is possible.

With the architecture of this invention, it is possible to achieve a capability of delivering current per unit area of planar silicon occupied by the cells far greater than with prior art architectures based on active cells areas defined on the plane of the silicon substrate. In practice, the deliverable current capacity is orders of magnitude greater than what is possible to achieve with the "planarly" defined cell areas of known architectures.

Moreover, the problems of sandwiching prefabricated membrane-electrode assemblies between distinct dies over the surfaces of which semicell electrodic structures have been formed are overcome by permitting a far more reliable process of filling microtrenches with a solution or colloidal suspension of ion exchange resin to be polymerized in situ to form the ion permeable separators the single elementary cells.

That which is claimed is:

1. A fuel cell device including a plurality of fuel cells formed in a conductive monocrystalline silicon layer, the device comprising:

a succession of electrically isolated conductive silicon bodies closely separated by etched parallel trenches in the silicon layer to define etched side surfaces of the silicon bodies;

each fuel cell comprising a pair of semicells including a semicell in the etched side surface of one of the silicon bodies in cooperation with an adjacent semicell in the etched side surface of a next silicon body of the succession, each semicell comprising a porous conductive silicon region extending into the silicon body from the etched side surface thereof, a non-passivatable metallic material at least partially coating the porous conductive silicon region, and a fluid feed duct, for at least one of fuel and oxygen, inside the silicon body and extending parallel to the etched side surface thereof, and in communication with the porous conductive silicon region; and an ion exchange material filling the trenches between the adjacent semicells and defining a solid electrolyte of the fuel cell.

2. The fuel cell device according to claim 1, further comprising catalytic material particles at least between the porous conductive silicon region and said ion exchange material.

3. The fuel cell device according to claim 2, wherein said catalytic material particles are on a surface of said non-passivatable metallic material.

4. The fuel cell device according to claim 2, wherein said catalytic material particles comprise at least one of platinum black, palladium black, iridium black and ruthenium black.

5. The fuel cell device according to claim 4, further comprising a binder for said catalytic material particles and the non-passivatable metallic material over the surface of said porous conductive silicon region.

6. The fuel cell device according to claim 1, wherein the plurality of fuel cells define an array of monopolar fuel cells.

7. The fuel cell device according to claim 1, wherein the plurality of fuel cells define a battery of bipolar fuel cells.

* * * * *

UNITED STATES PATENT AND TRADEMARK OFFICE

CERTIFICATE OF CORRECTION

| | |
|---|---|
| PATENT NO. | : 7,763,372 B2 |
| APPLICATION NO. | : 11/383088 |
| DATED | : July 27, 2010 |
| INVENTOR(S) | : D'Arrigo et al. |

It is certified that error appears in the above-identified patent and that said Letters Patent is hereby corrected as shown below:

| | |
|---|---|
| Column 1, Line 31 | Delete: "of" |
| Column 2, Line 8 | Delete: "fuid"<br>Insert: -- fluid -- |
| Column 2, Line 48 | Delete: "realizing multi"<br>Insert: -- realizing a multi -- |
| Column 4, Line 18 | Delete: "that is"<br>Insert: -- that it is -- |
| Column 7, Line 34 | Delete: "surface,"<br>Insert: -- surface. -- |
| Column 7, Line 36 | Delete: "which"<br>Insert: -- which to -- |
| Column 7, Line 59 | Delete: "than"<br>Insert: -- then -- |
| Column 8, Line 18 | Delete: "and"<br>Insert: -- an -- |
| Column 9, Line 41 | Delete: "semicelis"<br>Insert: -- semicells -- |
| Column 9, Line 48 | Delete: "To"<br>Insert: -- to -- |

Signed and Sealed this
Tenth Day of April, 2012

David J. Kappos
*Director of the United States Patent and Trademark Office*

CERTIFICATE OF CORRECTION (continued)
U.S. Pat. No. 7,763,372 B2

| | |
|---|---|
| Column 11, Line 10 | Delete: "separators the"<br>Insert: -- separators of the -- |